United States Patent [19]
Aaronson et al.

[11] 3,936,593
[45] Feb. 3, 1976

[54] SCRAMBLER AND DECODER FOR A TELEVISION SIGNAL

[75] Inventors: Gerald Aaronson, Brookline; William D. Murphy, Burlington, both of Mass.

[73] Assignee: GTE Laboratories Incorporated, Waltham, Mass.

[22] Filed: Aug. 5, 1974

[21] Appl. No.: 494,653

[52] U.S. Cl. ............... 178/5.1; 325/138; 325/144; 325/145
[51] Int. Cl.² ............................................. H04N 1/44
[58] Field of Search ............... 178/5.1; 179/1.5 R; 325/32, 138, 144, 145

[56] References Cited
UNITED STATES PATENTS

| | | | |
|---|---|---|---|
| 2,709,218 | 5/1955 | Gabrilovitch | 179/1.5 R |
| 3,180,927 | 4/1965 | Heppe et al. | 325/34 |
| 3,500,250 | 3/1970 | Frerking | 325/138 |
| 3,729,576 | 4/1973 | Court | 178/5.1 |
| 3,852,519 | 12/1974 | Court | 178/5.1 |

*Primary Examiner*—Richard A. Farley
*Assistant Examiner*—S. C. Buczinski
*Attorney, Agent, or Firm*—Irving M Kriegsman; Leslie J. Hart

[57] ABSTRACT

An improved scrambler and decoder for a television signal is described wherein a television carrier is inverted in phase and subjected to low frequency amplitude modulation to obtain enhanced channel security. The carrier amplitude modulation is obtained with a coding signal which is transmitted as a pilot signal in the form of frequency modulation of the carrier. The coding signal is recovered at the decoder with a phase lock network and used to regenerate an unscrambled carrier. The coding signal provides information for special functions such as subscriber access control, program selection and the like.

20 Claims, 1 Drawing Figure

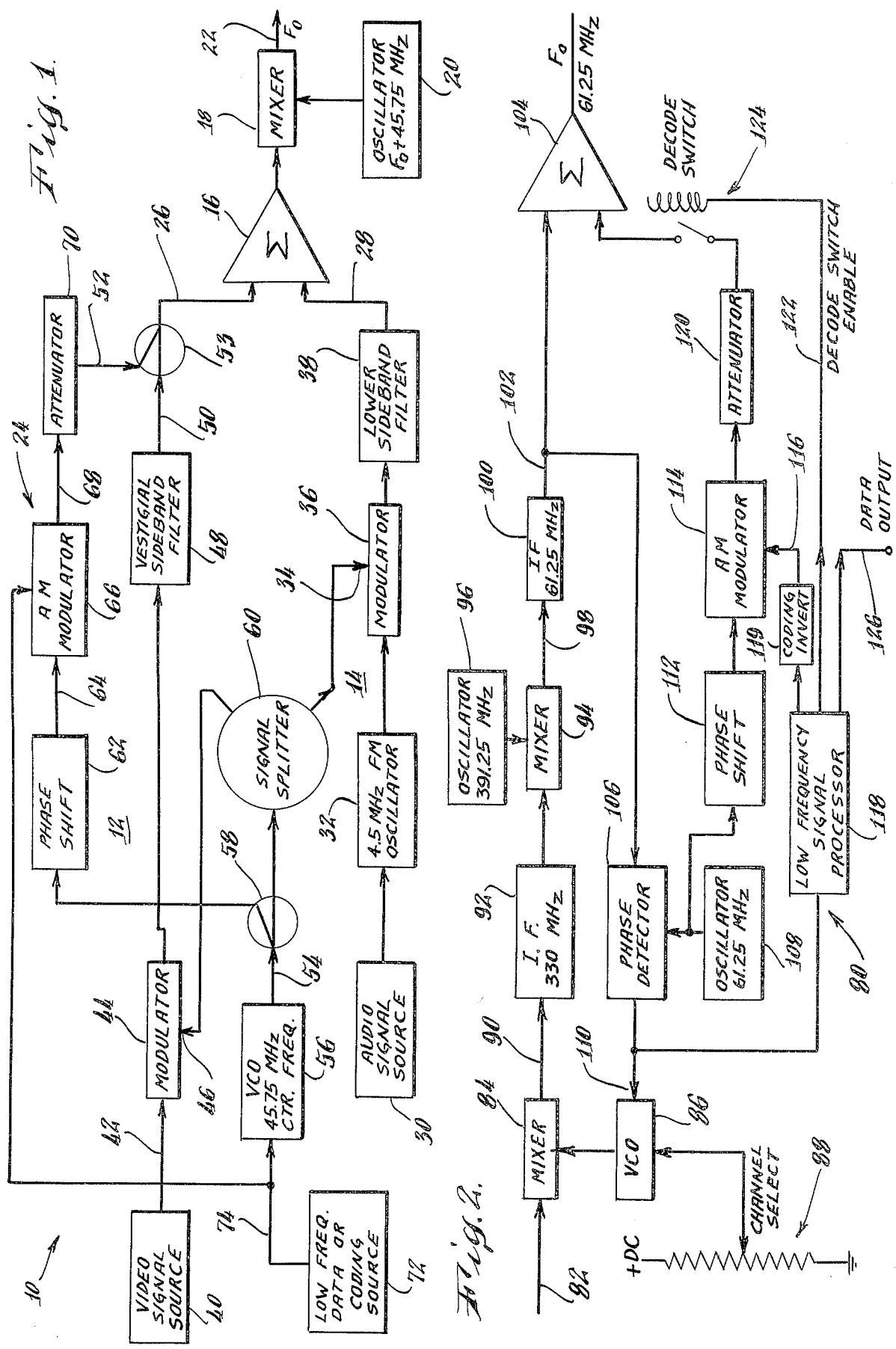

SCRAMBLER AND DECODER FOR A TELEVISION SIGNAL

FIELD OF THE INVENTION

This invention relates to an improved system for scrambling and decoding of a television signal. More specifically, this invention relates to a television scrambling and decoding system which incorporates useful information in the scrambling signals.

BACKGROUND OF THE INVENTION

The scrambling of television signals and the associated decoding thereof has been used and extensively described. The need for private transmission particularly arises in the cable television field where several of the many available television channels may carry programs which may only be viewed under special conditions such as after making prepayments.

Many devices have been proposed whereby television signals are transmitted in a scrambled form and cannot be displayed by a conventional receiver unless a specific decoding device is employed. Generally the scrambling techniques require complex decoders at the subscribers and present a relatively high investment when a large number of subscribers are to be provided with decoders to unscramble the received television signal.

Secret signaling is old in the art. An early U.S. Pat. No. 1,542,566 to Mathes issued in 1925 and described a system wherein the frequency band occupied by the signal was subdivided by filters into discrete separate bands. The subdivided bands are shifted in phase relative to each other and then recombined for transmission. At the receiver, the individual sub-bands are phase shifted in the order necessary to reconstruct the original signal.

The U.S. Pat. to Nyquist et al No. 1,726,578 teaches a secret signaling system wherein different frequencies in a signal are subjected to different degrees of delay. The original signal is restored by passing the received scrambled signal through a network which is complementary to that employed at the transmitter.

In the U.S. Pat. to Handsell No. 2,169,357 a secret signaling device is disclosed wherein a carrier is phase modulated and subsequently modulated with an audio signal to be kept private. The audio signal is recovered by re-introducing the carrier followed by filtering to remove higher frequency beats produced with the re-introduced carrier.

In the U.S. Pat. to Clothier No. 2,678,347 a system is described for rendering a television signal private except to the subscriber who is provided with a specific decoding mechanism. An error signal is introduced at the transmitter to phase modulate the video signal and this error signal is removed at the subscriber receiver. The U.S. Pat. to Bartelink No. 2,833,850 teaches another private subscriber television system wherein the video signal is scrambled to provide a private transmission reception. Many other television scrambling systems have been proposed such as described in the U.S. Pat. Nos. to Wendt et al 2,875,270, Druz et al 2,987,576, Kahn 3,333,052, Zopf et al 3,717,206 and Court 3,729,576.

In the Court patent a system is described wherein a video modulated carrier is further modulated with a sine wave in synchronism with the horizontal line frequency. The sine wave's frequency and phase are selected to depress sync pulses and blanking information while enhancing other parts of the video signal. The decoding device at the receiver provides a decoding sine wave which is in antiphase with the encoding sine wave modulation.

In a copending patent application entitled "Scrambler and Decoder for a Television Signal" filed by Gerald Aaronson and Leo I. Bluestein on the same date herewith and assigned to the same assignee as for this invention, a system for rendering a television channel private is described. An rf modulated television signal has its normal unscrambled carrier replaced with an amplitude adjusted scrambling carrier of the same frequency but different phase. The resulting television signal is effectively scrambled and rendered private by virtue of the impairment of the displayability of the scrambled television signal on a conventional television set. The inverted picture obtained with this scrambling system may be recovered in a simple manner by reversing the polarity of the receiver video detector diode.

SUMMARY OF THE INVENTION

In the television signal scrambling and decoding system in accordance with the invention a similar carrier scrambling technique as described in the above identified copending patent application is employed. The scrambling carrier, however, is further modulated in a manner to enhance the security of the scrambled television signal while providing a convenient signal for carrying additional useful information.

A coding signal is produced which is applied to amplitude modulate the scrambling carrier at a frequency and amplitude selected to render the scrambled television signal more difficult to decode. Removal of the additional coding signal at the unscrambling location is obtained with a pilot signal transmitted with the scrambled television signal in the form of a corresponding frequency modulation of the scrambling carrier.

The decoder removes the amplitude modulation from the scrambling carrier and regenerates the normal carrier for its replacement in the received television signal. The decoder regenerates the coding signal which may then be used to provide additional information.

It is, therefore, an object of the invention to provide a television scrambler and decoder system capable of high security. It is a further object of the invention to provide a method and system for a television scrambler and decoder wherein the scrambling signals may be used to convey information.

BRIEF DESCRIPTION OF DRAWINGS

These and other objects and advantages of the invention can be understood from the following description of a preferred embodiment described in conjunction with the drawings wherein FIG. 1 is a schematic block diagram for a television signal scrambler in accordance with the invention; and FIG. 2 is a schematic block diagram for decoding a scrambled television signal in accordance with the invention.

DETAILED DESCRIPTION OF EMBODIMENT

With reference to FIG. 1, a television signal scrambler 10 for use with a cable television system is shown. The scrambler 10 uses circuitry as is generally described with reference to FIG. 3 of the above identified copending patent application. The scrambler 10 includes a visual channel 12 and an audio channel 14 which are combined at a summing network and amplifier 16. The output from network 16 is applied to a mixer 18 together with a carrier signal from an oscillator 20 having an output frequency selected to produce a television signal on mixer output 22 for a preselected channel frequency. A scrambling circuit 24 is provided operative on the visual channel 12 to generate a scrambled picture carrier on output line 26.

The audio channel 14 is unscrambled and provides an audio modulated carrier on output 28 for combination with the scrambled picture carrier on line 26 by summing network 16. The audio channel 14 includes a conventional source 30 of audio signals such as a microphone and preamplifier (not shown). The audio signal source 30 FM modulates a 4.5 MHz sound carrier oscillator 32 for appropriate placement of the sound signal in a standard television channel. The FM modulated sound signal in turn amplitude modulates an intermediate frequency (IF) carrier on input 34 of a modulator 36. The sound modulated IF carrier is passed through a filter 38 to remove the upper sideband and 45.75 MHz carrier and provide and desired IF sound carrier on line 28.

The visual channel 12 includes a conventional source 40 of video signals such as from a tape recorder or video camera. The video signals on line 42 are applied to an IF carrier modulator 44 provided with the same IF carrier on input 46 as applied to input 34 of the IF carrier modulator 36 in the sound channel. The output from modulator 44 is passed through a filter 48 which provides a standard video carrier modulated vestigial sideband signal on filter output 50 for combination with a scrambling IF carrier on line 52 from scrambling network 24 in coupler 53.

The scrambler network 10 operates by altering the characteristics of the carrier employed in the transmission of the television signal. The carrier used originates at the output 54 of a voltage controlled oscillator 56 which normally operates at an intermediate frequency (IF) of 45.75 MHz. The carrier on line 54 is applied through a directional coupler 58 to a signal splitter 60 which provides inputs 35, 46 of modulators 36, 44 with the same IF carrier signal.

Another output of coupler 58 is applied to a phase shift network 62 which provides about 180° overall phase shift to the IF carrier appearing at the output of directional coupler 26. The phase shifted IF carrier on line 64 is applied to an amplitude modulator 66 whose output 68, in turn, is applied through an adjustable attenuator 70 to provide a scrambled IF carrier on output 52.

The scrambling network 24 differs from that described in the copending patent application in that an additional level of security is provided by simultaneously amplitude modulating the inverted carrier on line 64 with a low frequency coding signal of up to 500 Hz. A source 72 for producing the coding signal on line 74 is provided. The coding signal source may be an oscillator, or a specially coded low frequency signal which can convey useful information to a subscriber location. Coding may be obtained with pulse-modulation by, for example, turning a coding oscillator on for different time periods respectively interpreted as different information.

Since the IF carrier amplitude modulation is to be removed at the receiver, a pilot signal representative of the coding signal on line 74 is transmitted. The pilot signal is generated by FM modulating the IF carrier a predetermined amount simultaneously with the amplitude modulation of the inverted carrier. The coding signal line 74 is thus coupled to the IF variable oscillator 56 to provide the latter with a small amount of frequency deviation, i.e. about ±15 KHz at the low coding signal rate of up to 500 Hz. The deviation and modulation frequency of the IF carrier are kept small to avoid unremovable television picture signal interference which would be objectionable to a subscriber at a receiver end.

The amplitude of the scrambling carrier on line 52 is selected sufficient to replace the normal carrier in the vestigial sideband signal on line 50. The resulting picture carrier on line 26 is effectively scrambled and secure from display on conventional television sets.

In FIG. 2 a decoder network 80 is shown whereby the received television signal on a cable television input line 82 corresponds to the television signal generated in a scrambled form on line 22 with the scrambler 10 shown in FIG. 1. The decoder 80 generally uses similar circuits as employed in the converter network as shown in and described with reference to FIG. 6 in the above identified copending patent application. The received television signal is applied to a mixer 84 which is supplied by a local oscillator from a voltage controlled oscillator (VCO) 86 turnable over a wide range with a channel selector 88 in the form of a potentiometer. The VCO 86 frequency is selected so that the mixer output 90 is an IF signal of 330 MHz which, in turn, is passed through an IF amplifier 92.

The output of IF amplifier 92 is applied to a mixer 94 which, in turn is supplied with a local oscillator signal from source 96 having a frequency selected to provide a predetermined normally unused television channel signal at output 98. In many localities such unused channel is channel 3 so that the frequency of oscillator 96 is 391.25 MHz to provide a television signal carrier at a frequency of 61.25 MHz (channel 3) on mixer output 98.

The output 98 of mixer 94 is amplified in an IF amplifier 100 centered at 61.25 MHz whose output 102 is applied to a summing network 104. The channel 3 or 61.25 MHz signal at output 102 of IF amplifier 100 is also applied to a phase detector 106 for phase comparison with the output signal of an oscillator 108 of a frequency of 61.25 MHz. The phase signal output from phase detector 106 is applied to a voltage sensitive input 110 of VCO 86 with a polarity and magnitude selected to phase lock the IF output on line 102 to oscillator 108. Since the frequency of oscillator 108 is fixed, the operation of the phase lock results in a removal of the frequency modulation from line 102 as originally produced by the application of the coding signal to the VCO 56 of FIG. 1.

Since the IF output on line 102 includes an inverted or scrambling carrier, the normal carrier is generated by applying the output of oscillator 108 to a phase shift network 112. This provides a sufficient phase shift to generate an IF carrier on line 114 180° out of phase as the scrambled IF carrier on line 102. When a phase shift of 180° between a normal and scrambling carrier is used, the phase shift network 112 adds about 90° phase shift since about 90° phase shift is obtained from the phase lock of oscillator 108.

The output of phase shift network 112 is applied to an amplitude modulator 114 together with a recovered coding signal on line 116. The coding signal is detected from the FM modulation pilot signal present in the output IF carrier on line 102. The output of phase detector 106 is a phase control signal which reflects the low frequency FM modulation in the IF carrier output on line 102. The resulting varying control voltage from phase detector 106 is applied to a coding signal processor 118.

The processor 118 includes suitable amplifiers to provide an input to a phase shift network 119 so that the inverse of the coding signal can be applied on line 116 to generate the inverse amplitude modulation on the normal carrier from phase shift network 112. The output of modulator 114 is thus a reproduced amplitude modulated normal carrier which is adjusted with an attenuator 120 to enable precise replacement of the scrambling carrier by summing network 104.

The processor 118 may include information decoding network of a type which could identify, for example, the significance of the coding signal. Thus the processor includes suitable pulse duration detectors to identify a coding pulse length of a predetermined length. When such coding pulse is detected, an enable signal is applied on line 122 to actuate and close a customer related relay switch 124 which operates to regulate customer access to the scrambled television signal. Switch 124 may be as shown in series between the output of attenuator 120 and summing network 104 to control access by the subscriber to the scrambled channel.

Alternatively, data representative of the information in the coding signal may be made available on a line 126 for special controls. For example, different codes could be assigned to each program type, e.g. sports, movies, etc. being transmitted to subscribers. Decoders in processor 118 then would only respond to a particular code to permit the viewing of only specific programs purchased by the viewer.

Having thus described a scrambling and decoding system in accordance with the invention, its advantages can be appreciated. Enhanced security is obtained while enabling the transmittal of program coding information in the employed scrambling signals.

What is claimed is

1. In a system for scrambling and decoding a television signal modulated on a normal carrier which is replaced with a scrambling carrier having the same frequency as the normal carrier but with a predetermined phase difference therefrom and where the scrambled television signal is decoded at a receiving end by regenerating the normal carrier from the scrambling carrier for the latter's replacement by the regenerated normal carrier the improvement comprising
   means for generating a coding signal of a frequency selected to enable modulation of the scrambling carrier for enhanced security;
   means responsive to the coding signal for amplitude modulating of the scrambling carrier;
   means responsive to the coding signal for frequency modulating of the scrambling carrier;
   means at the receiving end for detecting the frequency modulation to reproduce the coding signal; and
   means for replacing the scrambling carrier at the receiving end with the inverse amplitude modulated normal carrier to provide a normally displayable television signal.

2. The improved television scrambling and decoding system as claimed in claim 1 wherein the coding signal is a signal selected of sufficiently low frequency to inhibit production of non-removable and objectional interference with the television signal.

3. The improved television scrambling and decoding system as claimed in claim 2 and further including
   a frequency variable oscillator of an intermediate frequency (IF);
   means responsive to the IF oscillator for producing video and audio modulated IF signals, and wherein said coding signal is applied to both the frequency variable oscillator and said amplitude modulating means to simultaneously generate amplitude and frequency modulation of the scrambling carrier.

4. The improved television scrambling and decoding system as claimed in claim 3 wherein the frequency modulation detecting means further includes
   means including a receiver IF oscillator operating at a receiver IF for phase locking the received television signal to the receiver oscillator.

5. The improved television scrambling and decoding system as claimed in claim 4 wherein the phase locking means further includes
   means including a variable receiver local oscillator for converting the received scrambled television signal to the receiver IF; and
   a phase detector responsive to the receiver IF oscillator and the receiver IF from the converting means to produce an output signal representative of the difference in phase therebetween, said signal being applied to the variable receiver local oscillator with a magnitude and polarity selected to establish phase lock between the receiver IF and the receiver IF oscillator, said signal also being representative of the coding signal.

6. The improved television scrambling and decoding system as claimed in claim 5 wherein the normal carrier generating means further includes
   means responsive to the receiver IF oscillator for producing a phase shift carrier whose phase is substantially the phase of the normal carrier;
   means for generating the inverse of the coding signal; and
   a modulator coupled to the inverse coding signal and the normal carrier output from the phase shifting means for modulation thereof by the coding signal.

7. An apparatus for scrambling an input television signal amplitude modulated on a normal carrier comprising
   means for producing a scrambling carrier signal of the same frequency as the normal carrier signal and with a preselected phase difference therebetween;
   means for generating a coding signal of a frequency selected to enable modulation of the scrambling carrier for enhanced security;
   means for amplitude modulating the scrambling carrier with the coding signal; and
   means for frequency modulating the normal and scrambling carrier signals to impose a pilot signal representative of the coding signal; and
   means for substantially replacing said normal carrier in the carrier modulated television signal with the amplitude modulated scrambling carrier.

8. The apparatus for scrambling an input television signal as claimed in claim 7 wherein the frequency modulating means further includes
   a variable local oscillator operating at the carrier frequency, said coding signal being coupled to the variable oscillator to produce frequency variation thereof in correspondence with the coding signal; and means for applying the output of the local oscillator to generate a common frequency source for said normal and scrambling carriers.

9. The apparatus for scrambling an input television signal as claimed in claim 8 wherein the coding signal generating means produces a coding signal characterized with information for use at a receiving location.

10. The apparatus for scrambling an input television signal as claimed in claim 9 wherein the coding signal generating means further produces a coding signal whose frequency is selected sufficiently low to inhibit production of non-removable and objectionable interference of the television signal at a receiving end.

11. An apparatus for decoding a received scrambled television signal applied with a scrambling input carrier which is out of phase with a normal unscrambled carrier and amplitude modulated for enhanced security comprising means for producing an oscillator signal representative of a desired intermediate frequency (IF) of the scrambling carrier;

means responsive to the received television signal for phase locking an IF converted representation of the received scrambled television signal to the oscillator signal;

means coupled to the phase locking means for producing a coding signal representative of a frequency modulation in the scrambling carrier;

means responsive to the oscillator signal for generating a normal carrier signal;

means for amplitude modulating the normal carrier signal with the inverse of the coding signal; and means for combining the amplitude modulated normal carrier with the phase locked IF scrambling carrier signal to remove the amplitude modulation therefrom for regeneration of an unscrambled television signal.

12. The apparatus for decoding a received scrambled television signal as claimed in claim 11 wherein the normal carrier signal modulating means further includes means for inverting the coding signal; and an amplitude modulator coupled to the normal carrier signal and the inverted coding signal for amplitude modulation of the normal carrier.

13. The apparatus for decoding a received scrambled television signal as claimed in claim 12 wherein the combining means further includes an attenuator responsive to the amplitude modulated normal carrier for amplitude adjustment thereof to a level selected to cancel the scrambled carrier and its amplitude modulation.

14. The apparatus for decoding a received scrambled television signal as claimed in claim 11 and further including switching means operatively located to interrupt the coupling of the normal carrier to the combining means for control over access to the received scrambled television signal; and means responsive to the coding signal for generating a control signal to said switching means to determine access to the received scrambled television signal.

15. The apparatus for decoding a received scrambled television signal as claimed in claim 11 wherein the phase locking means further includes means including a variable local oscillator for converting the received television signal to an IF frequency for viewing on a television receiver;

a phase detector responsive to the oscillator signal and the compatible IF frequency for producing an output signal having a polarity and magnitude indicative of the phase difference therebetween, said output signal being coupled to the variable local oscillator for frequency control thereof in a direction selected to establish phase lock between the compatible IF frequency and the oscillator signal.

16. A method for scrambling a television signal which is decoded at the receiving end to which the television signal is sent in a scrambled form comprising the steps of producing a coding signal selected to enable enhanced security scrambling of the television signal;

frequency modulating a normal carrier with the coding signal;

amplitude modulating the frequency modulated normal carrier with a television signal;

phase shifting the frequency modulated normal carrier to generate a scrambling carrier which is of the same frequency as the normal carrier but with a predetermined scrambling phase difference therebetween;

amplitude modulating the scrambling carrier with the coding signal; and replacing the normal carrier in the television signal modulated normal carrier with the amplitude modulated carrier for enhanced security television signal.

17. The method for scrambling a television signal as claimed in claim 16 wherein the coding signal producing step is characterized by the generation of a coding signal formed to convey information.

18. The method for scrambling a television signal as claimed in claim 17 wherein the coding signal is of a low frequency selected to prevent the generation of non-removable interference with the television signal at the receiving end.

19. The method for scrambling a television signal as claimed in claim 16 and further including a method for decoding the scrambled television signal at the receiving end comprising the steps of removing the frequency modulation of the scrambling carrier;

regenerating the coding signal from the received scrambled television signal;

regenerating a normal carrier from the scrambling carrier;

amplitude modulating the regenerated normal carrier with the inverse of the regenerated coding signal; and replacing the scrambling carrier with the inverse modulated regenerated normal carrier to reproduce a normal carrier amplitude modulated television signal for display by a television receiver.

20. The method for scrambling and decoding a television signal as claimed in claim 19 wherein the coding signal regeneration and frequency modulation steps further include the steps of generating a fixed intermediate frequency (IF) oscillator signal;

converting the received scrambled television signal to an IF television signal frequency with a variable local oscillator;

phase locking the IF television signal frequency to the IF oscillator signal by controlling the frequency and phase of the variable oscillator with a phase detector output signal indicative of phase lock, whereby the IF oscillator signal is representative of the scrambling carrier without frequency modulation and the output signal represents the regenerated coding signal.

* * * * *

PO-1050
(5/69)

UNITED STATES PATENT OFFICE
CERTIFICATE OF CORRECTION

Patent No. 3,936,593          Dated February 3, 1976

Inventor(s) Gerald Aaronson/William Murphy

It is certified that error appears in the above-identified patent and that said Letters Patent are hereby corrected as shown below:

Column 3, line 23, after "provide" delete "and" and
     insert --the--;
Column 3, line 43, delete "35" and insert --34--.

Signed and Sealed this twenty-seventh Day of April 1976

[SEAL]

Attest:

RUTH C. MASON
Attesting Officer

C. MARSHALL DANN
Commissioner of Patents and Trademarks